Nov. 25, 1969
CHENG-LIN CHEN
3,480,823
SEALED DISCHARGE DEVICE
Filed Aug. 12, 1966
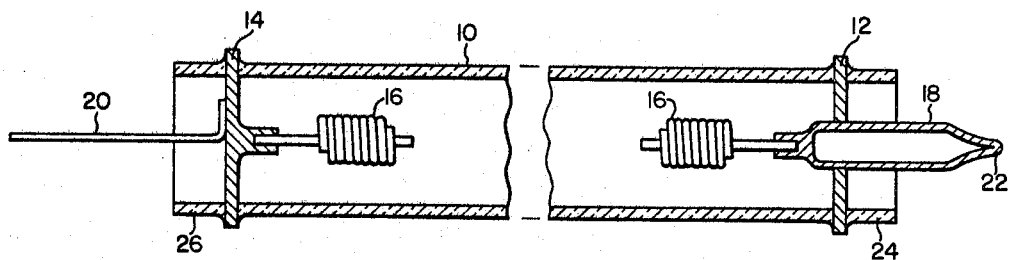
WITNESSES
Theodore F. Wrobel
James F. Young
INVENTOR
Cheng-Lin Chen
BY
Blair R. Studebaker
ATTORNEY

United States Patent Office 3,480,823
Patented Nov. 25, 1969

3,480,823
SEALED DISCHARGE DEVICE
Cheng-Lin Chen, Monroeville, Pa., assignor to Westinghouse Electric Corporation, Pittsburgh, Pa., a corporation of Pennsylvania
Filed Aug. 12, 1966, Ser. No. 572,056
Int. Cl. H01j 5/20
U.S. Cl. 313—317                                 5 Claims

ABSTRACT OF THE DISCLOSURE

A sealed discharge device including a ceramic envelope and refractory metal or alumina closure members sealing off the open ends of the ceramic envelope and having electrodes adjacent the ends of the envelope electrically connected through the closure members. The sealed discharge device further comprising a sealing composition hermetically bonding the closure members to the ceramic envelope, which sealing composition principally comprises from about 55 to 75% by weight of $Al_2O_3$ and from about 25 to 45% by weight of at least one material selected from the group consisting of BeO, BaO, CaO and SrO.

---

This invention relates to sealing compositions and more particularly to a sealing composition for bonding ceramics to refractory metals and ceramics to ceramics for high temperature applications.

The high mechanical strength and excellent insulation properties, both electrical and thermal, of ceramics at elevated temperatures have caused ceramic materials to play increasingly important roles in high power vacuum tubes, high power lamps as well as in many other electrical devices and structural elements. A particular problem in the use of the ceramic materials in high temperature applications is the bonding of the ceramic to metals, particularly refractory metals, to provide a hermetic seal. This problem of bonding ceramics, for example ceramics of high alumina content, to refractory metals has been more or less solved in situations where the application of the seal will not be subjected to temperatures in excess of 1000° C. For example, where the metal to ceramic joint will be exposed to temperatures of less than 400° C. during use and where alkali metal vapor atmospheres are not present a two step molybdenum-manganese metallizing process is available. In this process of the ceramic is metallized with a molybdenum-manganese powder followed by an appropriate coating of nickel or copper and the subsequent brazing of the metal member to the nickel or copper with a suitable brazing alloy. Another method, which is extensively used for low temperature applications, is the creation of metal to ceramic seals through a diffusion process where titanium or molybdenum is diffused into the ceramic in a hydrogen atmosphere and the metal part is then brazed onto the diffusion layer on the ceramic surface with an appropriate brazing metal such as for example, a copper-silver alloy.

Some success has been accomplished by employing metal alloys of high titanium-nickel content at less than 1500° C. in the bonding of ceramics of high alumina content to refractory metals. Successful bonds at these temperatures have also been accomplished by using glassy sealing materials to accomplish the bond having extremely high aluminum oxide content, in excess of 90%. Although these compositions are successful for bonding high alumina content ceramics to refractory metals at moderately high temperatures some applications require temperatures in excess of 1500° C.

The compositions of the present invention will successfully bond high purity ceramics, for example substantially pure, high-density polycrystalline alumina or sapphire to refractory metals such as niobium or tantalum. The sealing compositions may also be used for bonding high-density polycrystalline alumina or sapphire to high-density polycrystalline alumina or to other ceramics.

It is an object of the present invention to provide high temperature sealing compositions for bonding ceramics to metals.

Another object of the present invention is to provide sealing compositions for bonding high-density polycrystalline alumina members to refractory metal members such as niobium or tantalum.

A further object of this invention is to provide a sealing composition for bonding high-density polycrystalline alumina envelopes to niobium or tantalum end disks in the assembly of high temperature metal vapor lamps.

These and other objects are accomplished in accordance with the present invention in the bonding of alumina ceramics to refractory metals or alumina ceramics to alumina ceramics as for example in the arc tube of high temperature metal vapor lamp by employing a sealing composition which principally comprises from about 55 to 75% by weight of aluminum oxide and from about 25 to 45% by weight of at least one material selected from the group consisting of beryllium oxide, barium oxide, calcium oxide and strontium oxide. Additionally, from about 2 to 5% by weight of niobium with respect to the total weight of the aluminum oxide plus the material of said group may be employed to increase the bonding strength of the composition.

The foregoing as well as other objects along with many of the attendant advantages of the present invention will become more readily understood as the following detailed description is considered in connection with the sole figure of the accompanying drawing which illustrates one aplication for the sealing compositions of the present invention and represents a sectional view of a typical high-temperature, metal-vapor, discharge-lamp, arc tube.

The sealing compositions of the present invention basically comprise from about 55 to 75% by weight of $Al_2O_3$ and from about 25 to 45% by weight of one or more materials selected from BeO, BaO, CaO and SrO. In preparing the compositions of the present invention the materials in finely divided powder form are well mixed, and then suspended in a liquid vehicle as for example pentyl acetate. A viscosity imparting agent is then added to the mixture and may be an organic cement such as for example "DuPont" "Duco" cement. The amount of pentyl acetate and organic cement is just sufficient to provide a very thick paste. This sealing paste is then brushed on to the mating surfaces of the ceramic and metal parts which have, preparatory to being joined been degreased with a suitable degreasing agent such as acetone or nitric acid. The assembly is then placed in a vacuum furnace which may be for example the resistance type and the assembly heated at a rate which is dependent upon the physical size of the furnace and the vacuum conditions. In general, a vacuum of five microns or below is considered adequate. As will be described later in detail, in some instances during the heating of the assembly outgassing is required for the chemical decomposition of the batch mixture which is necessary in the forming of the final bonding composition from the carbonate due to the instability of the oxide. When this is necessary, the outgassing temperature is maintained during heating until the decomposition, removal of all $CO_2$, is completed and the vacuum conditions reconstituted. After the bonding temperature is reached, which is in a range of from about 1645 to 1780° C., that temperature is maintained for fram one to three minutes and then the assembly is colled first for about one minute rapidly to about 200° below the bonding temperature and then at about 70° C. per minute to about 1000° C. at which point the furnace is shut off and the assembly cooled by radiation.

One example of a sealing composition according to the present invention involves the admixing of 25% beryllium oxide and 75% aluminum oxide by weight with the liquid vehicle and viscosity imparting agent. With this composition no degassing is required and when bonding polycrystalline alumina to niobium a bonding temperature of 1780° C. should be maintained for approximately three minutes. When polycrystalline alumina is bonded to tantalum or polycristalline alumina with this composition, a bonding temperature of 1730° C. should be maintained for about 1.75 minutes.

Another example of a sealing composition of the present invention involves the admixing of approximately 39% finely divided barium oxide and approximately 61% finely divided aluminum oxide by weight with a suitable liquid vehicle and viscosity imparting agent. This composition is heated without degassing to a bonding temperature of 1770° C. and held for two minutes before cooling.

A further example of a sealing composition in accordance with the present invention consists of the admixing of 49.3% by weight of calcium carbonate and 50.7% by weight of aluminum oxide with a suitable liquid vehicle and a viscosity imparting agent. This composition after being applied to the mating surfaces of the ceramic and metal is heated in the resistance furnace to about 900° C. where calcium carbonate is decomposed to calcium oxide and carbon dioxide, the latter being removed by pumps. The degassing temperature of 900° C. is maintained generally for a few minutes until the system returns to a vacuum of five microns or less. The composition is then heated to 1720° C. and maintained at that temperature for about three minutes in the bonding of alumina to niobium. A bonding temperature of about 1645° C. is maintained for two minutes in bonding alumina to tantalum and a bonding temperature of about 1730° C. is maintained for about two minutes in bonding alumina to alumina with this composition. The final composition or bonding composition attained after the decomposition of the batch composition during the degassing period comprises about 34.8% by weight of calcium oxide and about 65.2% by weight of aluminum oxide.

A still further example of a sealing composition of the present invention consists of an initial batch composition of about 41.5% by weight of strontium carbonate and 58.5% by weight of aluminum oxide mixed with a suitable liquid vehicle and viscosity imparting agent. This composition when applied to the mating surfaces and placed in the resistance furnace is heated to about 1350° C. and maintained at that temperature to provide for the degassing. More particularly, as in the preceding composition the degassing involves the removal of carbon dioxide from the strontium carbonate through decomposition. After about five minutes at the degassing temperature, the five microns or below vacuum will be reconstructed and the assembly is then heated to about 1780° C. and held at that temperature for about three minutes to provide for the vacuum tight bonding. In this instance the final or bonding composition principally comprises about 41.9% by weight of strontium oxide and 58.1% by weight of aluminum oxide.

In each of the foregoing examples the bonding strength of the composition can be improved by the addition of from about 2 to 5% by weight, with respect to the total weight of the other constituents, of finely divided niobium powder.

It has further been found that the bonding temperatures indicated with respect to the foregoing specific examples are of some importance in providing seals of the highest quality. Generally, a range of ± 10° C. will provide optimum hermetic sealing and high bonding strength, in all instances.

One example of an application for which the sealing compositions of the present invention have proven extremely suitable is in the assembly of arc tubes for high temperature metal vapor lamps. An exemplary embodiment of such an arc tube is illustrated in the sole figure and includes a body member or envelope 10 generally of high density, sintered, polycrystalline alumina which has sealed thereto and is sealed off at each end by tantalum or niobium end disks or caps 12 and 14. The caps 12 and 14 may be equally as well constructed from a ceramic material such as for example a ceramic having a high alumina content. Each of the end disks or caps 12 and 14 have secured to their inner surfaces coiled tungsten electrodes 16 and on the exterior surfaces lead-in conductor members 18 and 20, respectively. Lead-in conductor 18 is in the form of a tantalum tube which extends through end disk 12 to provide for the evacuation of the interior of the arc tube and the insertion into the lamp of the discharge sustaining filling. After evacuation and charging of the arc tube the tubular lead-in conductor 18 is tipped off by means of squeezing and welding at 22. Short polycrystalline alumina backup rings 24 and 26 are also sealed to the outer surfaces of the tantalum or niobium end disks 12 and 14 respectively. When cup-shaped caps are employed instead of end disks illustrated the alumina backup rings are unnecessary.

When the arc tube illustrated in the drawing is sealed off, the mating surfaces between envelope 10, end disks 12 and 14 and backup rings 24 and 26 are coated with a paste like form of the compositions of the present invention. The coated parts are joined and placed in a vacuum furnace where the vacuum tight sealing and high strength bonding is accomplished in accordance with the above-described heating schedules.

As can be seen from the foregoing the novel sealing compositions of the present invention provide for the successful bonding of ceramics to metals or ceramics to ceramics in applications where hermetic seals are required between the materials and comparatively high temperature environments are anticipated (i.e., temperatures in excess of 1500° C.) by employing a composition which principally comprises from about 55 to 75% by weight of aluminum oxide and from about 25 to 45% by weight of at least one material selected from the group consisting of beryllium oxide, barium oxide, calcium oxide and strontium oxide.

Since various changes may be made in the above-described invention without departing from the spirit thereof, it is intended that all matter contained in the foregoing description or shown in the accompanying drawing shall be interpreted as illustrative and not in a limiting sense.

I claim as my invention:

1. A sealed discharge device comprising:
   (a) a hollow elongated ceramic envelope,
   (b) a refractory metal or alumina closure member positioned proximate each end portion of said ceramic envelope,
   (c) an electrode within said envelope adjacent each closure member and electrically connected therethrough, and
   (d) a sealing composition hermetically bonding said closure members to said ceramic envelope, said sealing composition principally comprising from about 55 to 75% by weight of $Al_2O_3$ and from about 25 to 45% by weight of at least one material selected from the group consisting of BeO, BaO, CaO and SrO.

2. A sealed discharge device according to claim 1 wherein said sealing composition additionally includes from about 2 to 5% by weight of niobium with respect to the total weight of said $Al_2O_3$ and said material of said group.

3. A sealed discharge device according to claim 1 wherein said sealing composition principally comprises $Al_2O_3$ in an amount of about 75% by weight and BeO in an amount of about 25% by weight.

4. A sealed discharge device according to claim 1 wherein said $Al_2O_3$ is present in an amount of about 61% by weight and said material of said group is BaO, present in an amount of about 39% by weight.

5. A sealed discharge device according to claim 1 wherein said sealing composition principally comprises $Al_2O_3$ in an amount of about 58% by weight and SrO in an amount of about 42% by weight.

References Cited

UNITED STATES PATENTS

| | | | |
|---|---|---|---|
| 2,857,663 | 10/1958 | Beggs | 313—317 XR |
| 3,189,677 | 6/1965 | Anthony et al. | 313—317 X |
| 3,243,635 | 3/1966 | Louden et al. | 313—317 |
| 3,324,543 | 6/1967 | McVey et al. | 29—472.9 |
| 3,363,134 | 1/1968 | Johnson | 313—317 X |
| 3,376,121 | 4/1968 | Lawrence | 313—317 X |
| 3,385,463 | 5/1968 | Lange | 313—317 X |

FOREIGN PATENTS 1,351,331  12/1963  France.

JOHN W. HUCKERT, Primary Examiner

ANDREW J. JAMES, Assistant Examiner

U.S. Cl. X.R.

29—472.9; 174—50.61; 313—221